Dec. 13, 1938.  A. H. J. DE L. SAINT GENIES  2,139,855
APPARATUS FOR PHOTOGRAPHY WITH OR WITHOUT COLOR
Filed April 10, 1935  2 Sheets-Sheet 1
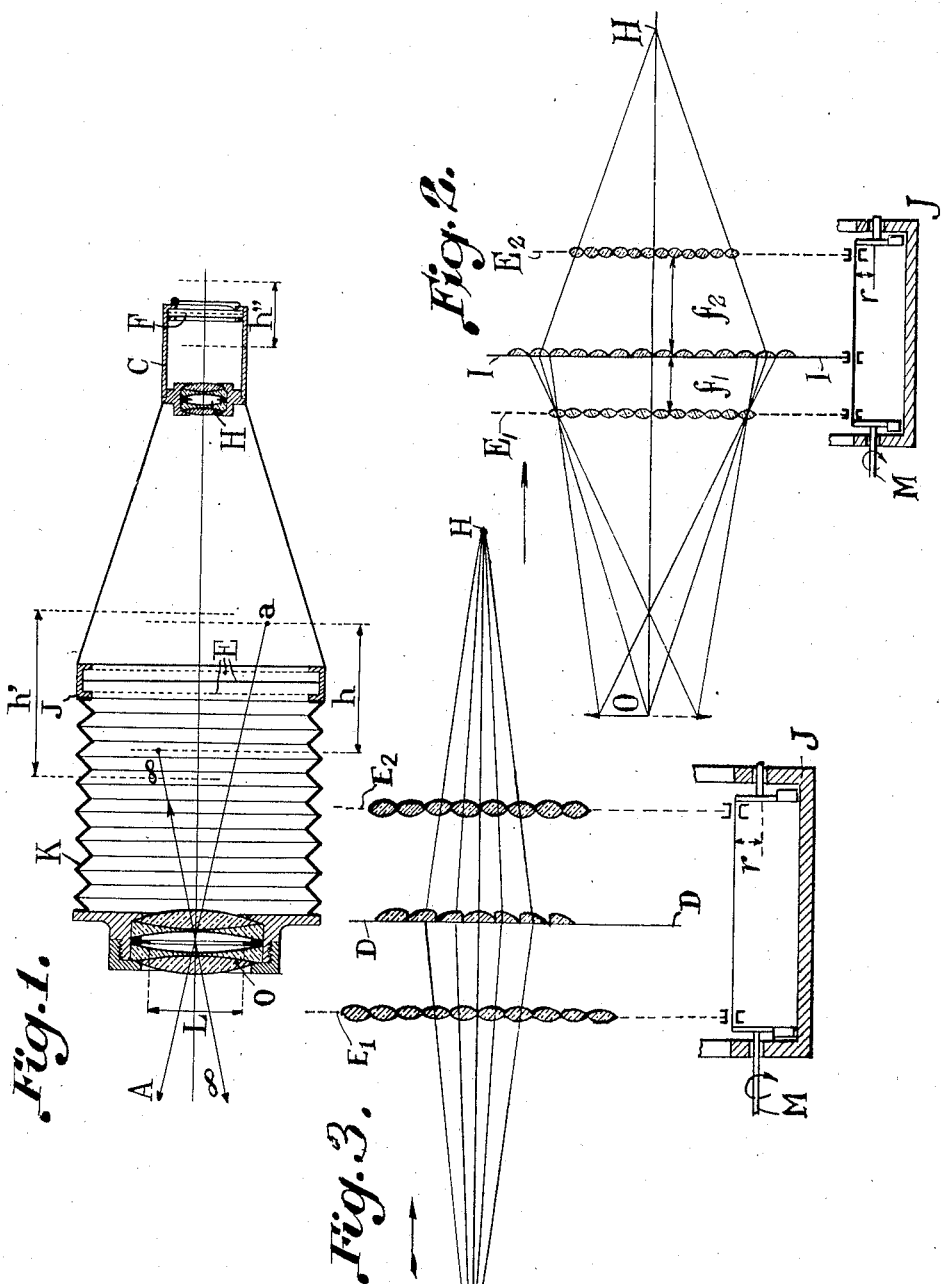
INVENTOR.
Anne Henri Jacques
de Lassus Saint Genies.
By Stone, Boyden & Mack.
ATTORNEYS.

Patented Dec. 13, 1938

2,139,855

UNITED STATES PATENT OFFICE 2,139,855

APPARATUS FOR PHOTOGRAPHY WITH OR WITHOUT COLOR

Anne Henri Jacques de Lassus Saint Genies, Versailles, France

Application April 10, 1935, Serial No. 15,644
In France April 14, 1934

4 Claims. (Cl. 88—16.6)

The present invention concerns broadly a means for taking and projecting images on and from photographic plates and, more particularly, cinematographic films, as stereoscopic images in correct or inverted relief and, if desired, in colors.

In view of the fact that it is very difficult to provide a view-taking apparatus, employing lenticular or goffered film of commercial dimensions, with an objective of sufficiently large useful diameter, of the order of the average spacing between the eyes or more, use is made, according to the present invention, of a method of taking successive photographs which consists in forming an aerial image construction by the aid of such an objective, associated with a suitable screen provided with networks, photographing this construction on lenticular or goffered plates of commercial dimensions and projecting these plates after copying onto a screen, the optical properties of which are similar to those of the intermediate screen above-mentioned.

The corresponding view-taking apparatus comprises an apparatus divided into two contiguous chambers the first containing an optical system of sufficient diameter and the second containing means for making a picture record of the aerial image construction produced in the first chamber. Instead of a single second chamber, a plurality thereof may be provided, for instance, for the purpose of separately recording the monochromes.

The invention also discloses the conditions of the projection and of the correct copying of the stereoscopic or colored stereoscopic images thus obtained.

In the accompanying drawings, by way of example and without geometrical exactitude, of course, Fig. 1 illustrates diagrammatically an apparatus for taking stereoscopic color photographs or cinematographic films, comprising two contiguous chambers, this apparatus being shown in section through a plane passing through the principal optical axis common to the objectives of the two chambers.

Fig. 2 illustrates in section through the same common optical axis, details of the screen, which comprises a lenticulated network, disposed between the two objectives of the apparatus.

Fig. 3 is a diagrammatic illustration after the manner of the arrangement shown in Fig. 2, but in which there is used a complex lens of the Fresnel type in lieu of the intermediate lenticulated network shown in Fig. 2.

Figure 4:
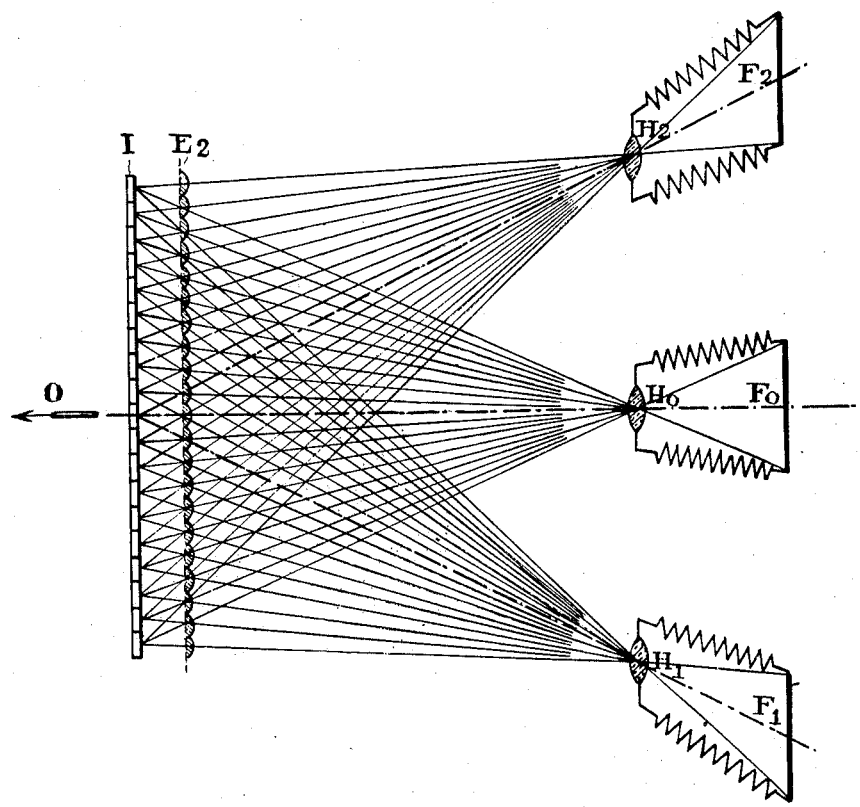
Fig. 4 shows a modification in which three secondary chambers are used.

In Fig. 1, the objective O, preferably orthoscopic, is of large diameter L, forming the basis of desirable view points, and is mounted in a first chamber K, furnishing an aerial image construction of depth equal to $h$, variable within certain limits. The field to be photographed may extend from the first plane A to infinity or to a finite distance, or may only extend to only the first plane. To this end, the extent of this chamber is variable. A screen E, which forms the subject of my copending patent application Serial No. 12,511 filed on the 22nd March 1935, is situated in this field of depth $h$, dividing it substantially in half.

This screen E transforms the aerial image given by O and of depth $h$, into an aerial image construction of suitable depth $h'$. This second image, when viewed from the region C, gives relief which is correct or inverted and of a depth, all of which depend on the number, the arrangement and the characteristics of the networks of which the screen E is composed.

C represents a second cinematographic chamber provided with all the usual mechanism (not illustrated) both for driving the film F and for operating the stop of the appropriate objective H. The chamber C will generally be rigidly connected with the frame J of the screen E, the objective H giving, as a result of the aerial image of depth $h'$, an aerial image of depth $h''$ conjugated, as it were, with $h'$ and enclosing the plane of the film F. This plane may therefore be the conjugate or substantially the conjugate, relatively to the objective H, of the defining plane E.

The film F will be goffered cylindrically or spherically according to the result it is desired to obtain; the aerial image of depth $h''$ recorded on it, and perceptible when it is regarded from the goffered side, will present an inverted relief to that of the image of depth $h'$ such as is seen from H.

Reproductions, or positive copies, of this original film will be projected on screens formed like those described in my above-mentioned copending patent application, for the observation of animated, changing, stereoscopic images.

Allowance must be made for the successive inversions or corrections of the relief which are introduced in taking or projecting, in order to obtain copies suitable for projection on projection screens which are suited to these copies and permit of observation in correct relief. Allowance must also be made for the successive inversions or corrections of the direction of the images in taking or projecting, in order to employ, or not to employ, correcting prisms or mirrors in projecting.

In Fig. 2, details of the screen E of the first chamber K of the view-taking apparatus are illustrated. It has been assumed here that this screen comprises, in particular, two networks $E_1$ and $E_2$ playing the same parts as the networks $R_2$ and $R_3$ disclosed in my above-mentioned copending patent application Serial No. 12,511. As explained in the specification of that application the simple or complex network $E_1$, (see Fig. 2 of the present specification) divides the light beams emanating from different points of the subject to be photographed and transversing the objective O into as many elementary light beams as optical elements, which may be cylindrical or spherical, are provided on $E_1$. These light beams form elementary images on the unpolished surface I. The network $E_2$ possesses cylindrical or spherical gofferings the focal plane on which coincides substantially with I and the distances of which, i. e. the "pitch", are such that the middle axes of the beams emanating from elementary images formed on I and transversing the optical element of the network $E_2$ meet one another in a certain distance which distance defines the zone of best observation of the image in relief. In this zone the objective H of the secondary chamber is provided. In the plane I, there has been assumed an unpolished plane coinciding with the focal plane common to the optical elements of these networks. For simplifying the conditions of view-taking and ensuring the transmission under optimum conditions of luminosity from one chamber to the other, the screen E has been supposed to comprise preferably two networks only.

The network $E_1$ gives at $i$ in the plane I a number of distinct and non-overlapping images of the emergent pupil of the objective O. The network $E_2$ gives these images an image area coinciding as exactly as possible with the entrant pupil of the objective H. Thus, as will be seen from Fig. 2, the optical centres of the lenses of the network $E_2$ lie on the straight lines extending through the centre of the objective H and through the centres of the small images on the unpolished plane I. It will also be apparent that the pitch of the network $E_2$ is different from, namely less than, that of the network $E_1$. However, in order to avoid, as much as is necessary, the disadvantages of the diffusion of light which may take place behind the unpolished plane I, the "optical elements" of $E_2$ may be divided into sections or there may be provided in close proximity to the plane I a lens D, of the Fresnel type, for example, of optical axis OH, making the centre of the entrant pupil of H conjugate with the centre of the emergent pupil of O. In this later case, the plane I need no longer be materialized by an unpolished plane.

To reduce to a minimum the dispersion of the luminous rays emanating from I, there may be used, according to Fig. 2, an intermediate lenticulated network, the optical elements of which correspond one by one to those of the network $E_1$.

Instead of the network D, there may be used a complex lens D of the Fresnel type, as shown in Fig. 3.

This is a system consisting of convergent elements and shown in section as the section of a convergent Fresnel lens, but the elements are preferably cylindrical and not annular.

However small the "optical elements" of the different networks of the screen E may be, the necessity of making these elements correspond to one another and to the images forming on I practically prevents going below a certain minimum dimension for these "optical elements" and, therefore, for the "pitch" of these networks.

The result of this is that for the aerial image given by the objective O, composed for each point image of an infinite number of rays, there is substituted, viewed from H, an aerial image construction where each point is the intersection of a finite number of "rays", this number being smaller the nearer these points are brought to E.

However, there can be obtained on the film F a picture record corresponding, with regard to the number of "rays" per point of the aerial image construction viewed from H, to the photograph of a real object, by suspending, in the frame J, carrying E, the interconnected networks in this screen E on two or more crankshafts such as M (Fig. 2) which are capable of animating these networks by a rotational and translational movement. In the case of the optical system D shown in Fig. 3, the latter may remain stationary.

The radii $r$, not necessarily equal on the same shaft from one network to the other of the rotation impressed on the networks of the screen, will be such, for example, that two "optical elements", adjacent or otherwise, on each network, will be substituted for one another in their respective planes during the period of exhibition of an image of the film F. During that period the operative relation with respect to the objective H will be as if every point of the aerial image construction, viewed from H, emitted an infinite number of "rays".

The film F which records the aspects of an aerial image construction comparable to a real object will nevertheless fix for each point of this object only a finite number of rays in proportion to the goffering of the film, however close it may be. However, the succession in time of the recorded images will produce, on projection, due to the independence and the certain non-correspondence of this goffering with the perforation of the film, and due also to the known phenomenon of persistence of vision, the effect of continuity equivalent to that which the consideration of real objects would produce on any observer looking at the projection screen.

If lenticularly goffered films are employed and if a polychrome screen is arranged in known manner in one or the other of the objectives of the view-taking apparatus, preferably in the objective of the cinematographic chamber, the divisions between the colored zones of this screen being preferably horizontal, a view can be taken, or projected, both stereoscopically and in color at the same time, the networks of the projection screen and in any case the network R, being goffered only cylindrically, preferably vertically.

In the whole of the above, it has been assumed that the view-taking apparatus was composed of two co-axial contiguous chambers having two distinct functions, the first chamber serving only to furnish the basis of points of sufficient view and an aerial image construction, and the second chamber being adapted to record as one image the aerial image construction produced by the first.

Given that the functions peculiar to each of the two chambers of the view-taking apparatus are neither changed nor altered if, under certain conditions, the principal optical axes, instead of coinciding, are only parallel at a certain spacing, the optical axis of the second chamber need not necessarily coincide with that of the first. Therefore, several positions can be found for the second chamber, or even several chambers can be substituted for it. The arrangement of these secondary chambers must then comply with the following conditions:

Their optical axes must be parallel to the optical axis of the primary chamber.

The spacings of these axes from one another must be defined in one direction only when the face of the intermediate screen which faces the second chamber or chambers carries cylindrical gofferings, and must be defined in all directions when this goffering is lenticular;

Finally, one should preferably avoid the use in the intermediate screen of a complex lens of the Fresnel type capable of hindering the uniform distribution of the luminous flux.

When these conditions are satisfied, there is obtained, according to my invention, on the emulsion of the film of each secondary chamber, a record of an image identical with that which is obtained with two coaxial chambers.

Each of the secondary chambers may be provided with an individual filter so as to record only one monochrome, and their number may correspond to the polychrome process adopted. Each of the secondary chambers shown in Fig. 4 may be provided with an individual filter so as to record only one monochrome, and their number may correspond to the polychrome process used.

With such an arrangement, the film employed may be goffered only cylindrically with generally vertical lining, as if it were only a question of recording stereoscopic or moving pictures, since the distinct monochromes are simultaneously recorded on the film, but on absolutely distinct portions of this film for each monochrome.

Fig. 4 shows schematically an arrangement in which three secondary chambers are used. The objectives $H_0$ $H_1$ $H_2$ are similar to one another and correspond substantially to the objective H of Fig. 1. They record images on the films $F_0$ $F_1$ $F_2$ and if monochromatic images have to be taken colored filters may be used. While the axes of the secondary cameras are not parallel, the main optical axes of the secondary objectives are all parallel to one another.

If the apparatus is adapted for cinematography, as many films may be run off as there are second chambers. Let $n$ be this number, that is to say, one film per monochrome. Alternatively, only a single film may be run off, but in each guide the driving mechanism will either have to cause an advancement of the film to $n$ images if each image has the maximum size permitted by the film, whilst from one guide to the other of the $n$ chambers, the film will form a loop of exactly determined lengths, or will have to cause an advancement equal to a whole number of these images lower than $n$, if the images recorded are smaller than the maximum size permitted by the film and if, on this maximum size, certain of the $n$ small images can be recorded and suitably juxtaposed, the film again forming between the guides of the $n$ chambers loops of determined length, and the window of each guide being correctly decentered in each chamber in order thus to ensure the desired juxtaposition of the $n$ small images.

It will easily be understood that no parallax will thus be introduced from one monochrome to the other.

Each of the $n$ objectives will be provided with a selective filter, as is obvious.

Finally, without any parallax, the same recording may take place on the condition, if necessary, of employing with the $n$ juxtaposed objectives, $n$ auxiliary optical systems comprising combinations of prisms or mirrors, for example, so that the objectives record their monochromes from a correct viewpoint for each, as these view points have been defined above (without a lens of the Fresnel type).

The projection in halls of such films and their copies on the same special screens as described above may take place, according to the conditions of the recording, either by means of $n$ projection apparatus (the principal axes of the optical projection systems being parallel and at spacings which are determined by considerations similar to those which applied for adjusting the spacing between the axes of the view-taking objectives), or by means of a single apparatus comprising a special optical projection system formed by $n$ juxtaposed objectives. In the first case, there are $n$ films or a single film forming the loops desired between the guides of the $n$ projection apparatus. In the second case, there is only one film.

In copying films intended for projection with $n$ apparatus as in the first case above-described, it may be also arranged that on the copy film, obtained by optical reproduction, the monochrome images are juxtaposed on the same portion of film which then allows projection with a single apparatus comprising an optical system formed by $n$ juxtaposed objectives. The maximum correction of the projection will be ensured, the filters being always separately and correctly adapted to the monochrome images, by adjusting the suitable different spacings, both of these objectives and of the monochrome images, or, if necessary, by adding to this complex optical system, further optical means, such as a combination of prisms or mirrors which allow each of the monochromes to be projected on the screen from a suitable projection point.

The films recorded with $n$ juxtaposed objectives may be used for making copies of the same or different size, according to the dimension of the films employed in taking and in projecting, and will be projected by means of similar complex optical systems, with the residue of parallax tolerated in taking, or without any parallax if the precautions desired have been observed when taking, as explained above.

Claims covering the subject-matter disclosed in Fig. 4 and the corresponding description are presented in the copending application Serial No. 238,868, filed November 4, 1938.

I claim:

1. Apparatus for taking pictures in relief on a lenticular film comprising a primary objective of large aperture, a secondary objective of small aperture associated with the lenticular film and a complex lenticular screen arranged between said objectives, said lenticular screen comprising an unpolished surface near the focal plane of said primary objective, a first lenticular network between said primary objective and said unpolished surface, said first lenticular network being arranged so that the unpolished surface lies in a plane conjugate with that of the primary objective with respect to said first lenticular network, said first lenticular network having means for forming on said unpolished surface a large number of small images of the exit pupil of said primary objective, and a second lenticular network on the side of the unpolished surface remote from the primary objective, said second lenticular network being arranged so that the unpolished surface lies in a plane conjugate with that of the secondary objective with respect to said second lenticular network, the centres of the optical elements of the second network lying on the straight lines extending through the centre of the secondary objective and the centres of the small images on the unpolished surface, said second network forming images of said small images in the entrance pupil of the secondary objective.

2. Apparatus for taking pictures in relief on a lenticular film comprising a primary objective of large aperture, a secondary objective of small aperture associated with the lenticular film and a complex lenticular screen arranged between said objectives, said lenticular screen comprising an image receiving surface near the focal plane of said primary objective, a first lenticular network between said primary objective and said unpolished surface, said first lenticular network being arranged so that the unpolished surface lies in a plane conjugate with that of the primary objective with respect to said first lenticular network, said first lenticular network having means for forming on said unpolished surface a large number of small images of the exit pupil of said primary objective, and a second lenticular network on the side of the unpolished surface remote from the primary objective, said second lenticular network being arranged so that the unpolished surface lies in a plane conjugate with that of the secondary objective with respect to said second lenticular network, the centres of the optical elements of the second network lying on the straight lines extending through the centre of the secondary objective and the centres of the small images on the unpolished surface, said second network forming images of said small images in the entrance pupil of the secondary objective.

3. Apparatus for taking pictures in relief on a lenticular film, comprising a primary objective of large aperture, a secondary objective of small aperture associated with the lenticular film and a complex lenticular screen arranged between said objectives, said lenticular screen comprising an image receiving surface in the form of a collecting optical refracting member at the focal plane of said primary objective, a first lenticular network between said primary objective and said image-receiving surface, said first lenticular network forming in a plane in the vicinity of said collecting optical refracting member a large number of small images of the exit pupil of said primary objective, said surface comprising a network composed of cylindrical segments forming a cylindrical lens of the Fresnel type arranged adjacent said optical collecting refracting member, and a second lenticular network on the side of the collecting optical refracting member remote from the primary objective, said Fresnel type lens redirecting the divergent axes of the light beams, emanating from the centres of the lenses of the first network, onto the centres of the lenses of the second network, the centres of the optical elements of said second lenticular network lying on the straight lines extending through the centre of the secondary objective and the centres of the small images in the vicinity of said collecting optical refracting member, said second lenticular network forming images of said small images in the entrance pupil of said secondary objective.

4. Apparatus for taking pictures in relief on a lenticular film, comprising a primary objective of large aperture, a secondary objective of small aperture associated with the lenticular film and a complex lenticular screen arranged between said objectives, said lenticular screen comprising an unpolished image receiving surface in the form of a collecting optical refracting member at the focal plane of the said primary objective, a first lenticular network between said primary objective and said image-receiving surface, said first lenticular network forming on the image receiving surface a large number of small images of the exit pupil of the said primary objective, a plane network of cylindrical segments forming cylindrical lenses adjacent the image receiving surface, and a second lenticular network on the side of the collecting optical refracting member remote from the primary objective, said plane network of cylindrical lenses redirecting the divergent axes of the light beams, emanating from the centres of the lenses of the first network, onto the centres of the lenses of the second network, the centres of the optical elements of said second lenticular network lying on the straight lines extending through the centre of the secondary objective and the centres of the small images in the vicinity of said collecting optical refracting member, said second lenticular network forming images of said small images in the entrance pupil of said secondary objective.

ANNE HENRI JACQUES DE LASSUS ST. GENIES.